United States Patent
Cheng et al.

(10) Patent No.: US 11,880,210 B2
(45) Date of Patent: Jan. 23, 2024

(54) MULTI-INTELLIGENT-AGENT COOPERATED TRANSPORTATION METHOD, SYSTEM AND COMPUTER READABLE STORAGE MEDIUM

(71) Applicant: SHENZHEN TECHNOLOGY UNIVERSITY, Guangdong (CN)

(72) Inventors: Tao Cheng, Guangdong (CN); Xinjia Yu, Guangdong (CN)

(73) Assignee: SHENZHEN TECHNOLOGY UNIVERSITY, Shenzhen (CN)

( * ) Notice: Subject to any disclaimer, the term of this patent is extended or adjusted under 35 U.S.C. 154(b) by 393 days.

(21) Appl. No.: 17/401,306

(22) Filed: Aug. 12, 2021

(65) Prior Publication Data
US 2022/0043463 A1 Feb. 10, 2022

Related U.S. Application Data (63) Continuation of application No. PCT/CN2020/108243, filed on Aug. 10, 2020.

(51) Int. Cl.
*G05D 1/02* (2020.01)

(52) U.S. Cl.
CPC ......... *G05D 1/0295* (2013.01); *G05D 1/0238* (2013.01); *G05D 1/0289* (2013.01); *G05D 1/0293* (2013.01); *G05D 2201/0216* (2013.01)

(58) Field of Classification Search
CPC .. G05D 1/0295; G05D 1/0238; G05D 1/0289; G05D 1/0293; G05D 2201/0216
See application file for complete search history.

(56) References Cited

U.S. PATENT DOCUMENTS

| | | | |
|---|---|---|---|
| 2002/0069018 A1* | 6/2002 | Brueckner | H04L 41/046 701/300 |
| 2014/0035725 A1* | 2/2014 | Bruemmer | G05D 1/0274 340/8.1 |

(Continued)

OTHER PUBLICATIONS

Y. Meng, O. Kazeem and J. C. Muller, "A Hybrid ACO/PSO Control Algorithm for Distributed Swarm Robots," 2007 IEEE Swarm Intelligence Symposium, Honolulu, HI, USA, 2007, pp. 273-280, doi: 10.1109/SIS.2007.367948. (Year: 2007).*

*Primary Examiner* — Donald J Wallace (57) ABSTRACT

The present disclosure relates to the field of swarm intelligence and provides a multi-intelligent-agent cooperated transportation method and system as well as a computer readable storage medium. The method includes: establishing a transportation model of a multi-intelligent-agent formation, and performing obstacle avoidance control between intelligent agents and neighbor intelligent agents based on pheromones of the intelligent agents themselves and the neighbor intelligent agents of the intelligent agents; acquiring, by a leader intelligent agent, state information of the leader intelligent agent by utilizing a distributed observer triggered based on self-pheromone release; regulating, by utilizing an intelligent agent cooperation controller triggered based on self-pheromone release, state information of the intelligent agents according to the state information of the leader intelligent agent; and enabling the neighbor intelligent agents of the intelligent agents to jump the queue to the multi-intelligent-agent formation according to the state information of the intelligent agents when obstacles are encountered.

9 Claims, 2 Drawing Sheets

(56) References Cited

U.S. PATENT DOCUMENTS

2019/0227540 A1\* 7/2019 Suvitie .................. G05D 1/104
2023/0112972 A1\* 4/2023 Yu .......................... G16B 40/00
701/117

\* cited by examiner

MULTI-INTELLIGENT-AGENT COOPERATED TRANSPORTATION METHOD, SYSTEM AND COMPUTER READABLE STORAGE MEDIUM

CROSS REFERENCE TO RELATED APPLICATIONS

The present application is a Continuation Application of PCT Application No. PCT/CN2020/108243 filed on Aug. 10, 2020, the contents of which are incorporated herein by reference in their entirety.

TECHNICAL FIELD

The present disclosure relates to the field of swarm intelligence, and in particular, to a multi-intelligent-agent cooperated transportation method and system as well as a computer readable storage medium.

BACKGROUND

In the field of swarm intelligence, individuals of intelligent agents (such as sensors, robots and air vehicles) have limited abilities, but a swarm formed from them may show an efficient cooperative ability and a high intelligent coordination level. The intelligent agents are commonly applied to cargo transportation in unmanned scenarios such as unmanned supermarkets and intelligent storage. In these scenarios, how to form a plurality of intelligent agents to transport cargos is a problem worthy of studying. During formation in the prior art, formation is frequently disorganized due to interference from obstacles, and thus, a transportation task can not be completed well.

SUMMARY

Embodiments of the present disclosure provide a multi-intelligent-agent cooperated transportation method and system as well as a computer readable storage medium to solve the problem that a transportation task may not be completed well when existing multi-intelligent-agent cooperated transportation is interfered by obstacles. Technical solutions will be described as follows.

In one aspect, there is provided a multi-intelligent-agent cooperated transportation method, including:
  establishing a transportation model of a multi-intelligent-agent formation, and performing obstacle avoidance control between intelligent agents and neighbor intelligent agents based on pheromones of the intelligent agents themselves and the neighbor intelligent agents of the intelligent agents;
  acquiring, by a leader intelligent agent, state information of the leader intelligent agent by utilizing a distributed observer triggered based on self-pheromone release;
  regulating, by utilizing an intelligent agent cooperation controller triggered based on self-pheromone release, state information of the intelligent agents according to the state information of the leader intelligent agent; and
  enabling the neighbor intelligent agents of the intelligent agents to jump the queue to the multi-intelligent-agent formation according to the state information of the intelligent agents when obstacles are encountered.

In another aspect, there is provided a multi-intelligent-agent cooperated transportation system, including:
  a model establishing module, configured to establish a transportation model of a multi-intelligent-agent formation, and perform obstacle avoidance control between intelligent agents and neighbor intelligent agents based on pheromones of the intelligent agents themselves and the neighbor intelligent agents of the intelligent agents;
  a state acquiring module, configured to acquire, by a leader intelligent agent, state information of the leader intelligent agent by utilizing a distributed observer triggered based on self-pheromone release;
  a state regulating module, configured to regulate, by utilizing an intelligent agent cooperation controller triggered based on self-pheromone release, state information of the intelligent agents according to the state information of the leader intelligent agent; and
  a queue jumping module, configured to enable the neighbor intelligent agents of the intelligent agents to jump the queue to the multi-intelligent-agent formation according to the state information of the intelligent agents when obstacle are encountered.

In further aspect, there is provided a multi-intelligent-agent cooperated transportation system, including a memory, a processor and a computer program stored in the memory and capable of running on the processor, a code of the computer program, when loaded and executed by one or more processors, causes the processor to perform the operations in the multi-intelligent-agent cooperated transportation method.

In yet further aspect, there is provided a computer readable storage medium storing a computer program therein, the computer program, when loaded and executed by a processor, causes the processor to perform the operations in the multi-intelligent-agent cooperated transportation method.

It may be known from the above-mentioned technical solutions provided by the present disclosure that the transportation model of the multi-intelligent-agent formation is established, and the obstacle avoidance control between the intelligent agents and the neighbor intelligent agents is performed based on the pheromones of the intelligent agents themselves and the neighbor intelligent agents of the intelligent agents; the leader intelligent agent acquires the state information of the leader intelligent agent by utilizing the distributed observer triggered based on self-pheromone release; the state information of the intelligent agents is regulated by utilizing the intelligent agent cooperation controller triggered based on self-pheromone release according to the state information of the leader intelligent agent; and the neighbor intelligent agents of the intelligent agents are enabled to jump the queue to the multi-intelligent-agent formation according to the state information of the intelligent agents when obstacles are encountered. Therefore, when encountering the obstacles, the intelligent agents can still keep the formation to satisfactorily complete a transportation task.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF THE EMBODIMENTS

For clearer descriptions of the objectives, technical solutions, and advantages of the present disclosure, embodiments of the present disclosure are described in detail hereinafter with reference to accompanying drawings.

Figure 1:
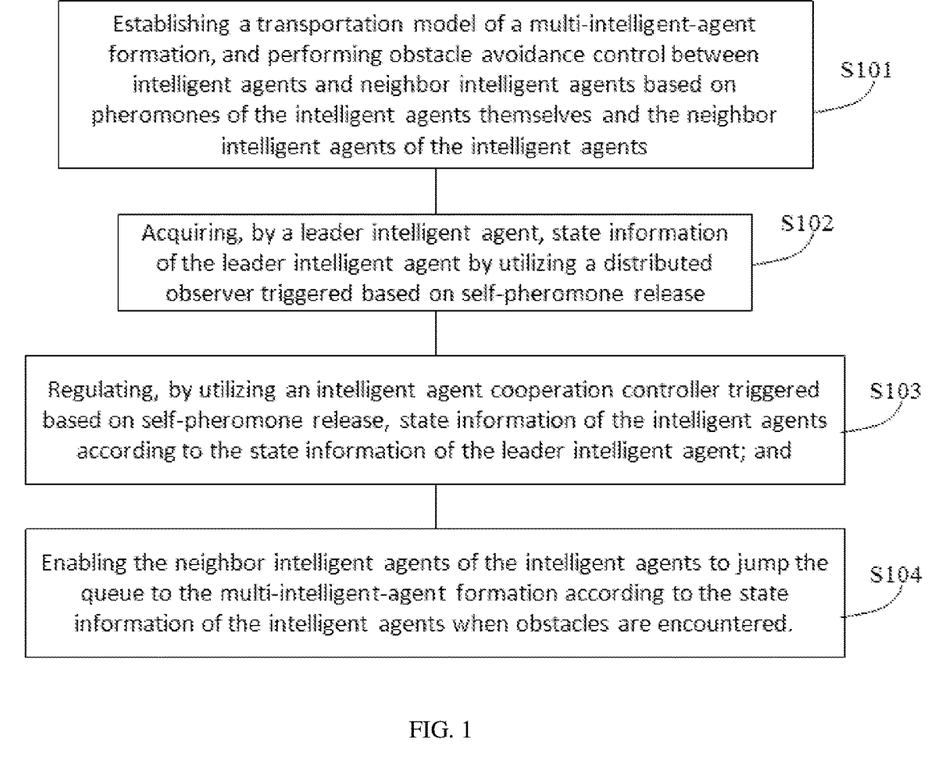
FIG. 1 is a process diagram of a multi-intelligent-agent cooperated transportation method according to an embodiment of the present disclosure.

Reference is made to FIG. 1 which illustrates a multi-intelligent-agent cooperated transportation method according to an embodiment of the present disclosure. The method mainly includes the following steps S101 to S104 which are described in detail as follows.

In step S101, a transportation model of a multi-intelligent-agent formation is established, and obstacle avoidance control between intelligent agents and neighbor intelligent agents is performed based on pheromones of the intelligent agents themselves and the neighbor intelligent agents of the intelligent agents.

In the embodiment of the present disclosure, the multi-intelligent agent includes a plurality of intelligent agents, such as intelligent swarms formed from automatd guided vehicles (AGV). As an embodiment of the present disclosure, when the transportation model of the multi-intelligent-agent formation is established, a Cartesian coordinate system is selected as a global coordinate system to respectively establish a transportation model following the multi-intelligent-agent formation and a driving model of a leader intelligent agent. The established transportation model following the multi-intelligent-agent formation is expressed as:

$$\begin{cases} \dot{q}_i(t) = k_1 p_i(t) \\ \dot{p}_i(t) = k_2 u_i(t) \end{cases},$$

wherein $\dot{q}_i(t) \in R^{n_i}$ represents the position of an $i^{th}$ intelligent agent, $\dot{p}_i(t) \in R^{n_i}$ represents the speed of the $i^{th}$ intelligent agent, $u_i(t) \in R^{m_i}$ represents the input control amount of the $i^{th}$ intelligent agent, $k_1$ and $k_2$ respectively represent experiential linear coefficients of $p_i(t)$ and $u_i(t)$, i=1, 2, . . . , N, and $n_i$ and $m_i$ represent dimensionalities.

The above-mentioned established driving model of the leader intelligent agent is expressed as: $\dot{x}_l(t)=Sx_l(t)$, wherein $S \in R^{p \times p}$ represents a constant coefficient matrix of the leader intelligent agent, all characteristic values of which have no negative real parts, and $x_l(t) \in R^p$ represents the state information of the leader intelligent agent and includes information such as position and speed, and p represents a dimensionality.

In step S102, the leader intelligent agent acquires state information of the leader intelligent agent by utilizing a distributed observer triggered based on self-pheromone release.

In order to get rid of the dependence on global information, an observer for a matrix S is designed for each following intelligent agent, and an observer for the state information of the leader intelligent agent is further designed by virtue of the observed matrix S.

The above-mentioned distributed observer triggered based on self-pheromone release is expressed as:

$$\dot{\theta}_i(t) = S_i(t)\theta_i(t) + d_i(t)\hat{g}_{li}(t),$$

$$\dot{d}_i(t) = a_i \hat{g}_{li}^T(t)\hat{g}_{li}(t)$$

wherein $S_i(t)$ represents an observed value of a constant system matrix S observed by an intelligent agent i, $\theta_i(t)$ represents state estimation information of the leader intelligent agent, $t_l^i(t)$ represents a $l^{th}$ pheromone release time, $d_i(t)$ represents a self-pheromone release time-varying parameter, $d_i(0) \geq 1$, $a_l$ represents a positive real number, t represents a time, i=1, 2, . . . , N, $a_{ij}$ is a communication identifier, is 0 or 1 and represents a communication state between the intelligent agent i and an intelligent agent j, and $a_{i0}$ represents a communication state between the intelligent agent i and the leader intelligent agent. The pheromone release time is decided by a pheromone release condition, and a $(k_i+1)^{th}$ pheromone release time is acquired according to the following equation:

$$t_{k_i+1}^i = \frac{7}{8}t_{k_i+1}^i + \tilde{\tau}_{k_i}^i,$$

wherein $t_{k_i}^i$ represents a $k_i^{th}$ pheromone release time, $\tilde{\tau}_{k_i}^i > 0$ represents a positive time, and $\tilde{\tau}_{k_i}^i$ is determined according to the following equation:

$$\tilde{\tau}_{k_i}^i = \inf_{t > t_{k_i}^i}\{t - t_{k_i}^i \mid l_i(t)d_i(t)\theta_{ei}^T(t)\theta_{ei}(t) > \hat{g}_{1i}^T(t)\hat{g}_{1i}(t), t \geq 0\},$$

wherein both $l_i(t)$ and $d_i(t)$ represent first self-pheromone release parameters, $l_i(0) \geq 1$, $d_i(0) \geq 1$, $a_2 > 0$, $a_2$ is a positive real number, and $\theta_{ei}(t)$ represents an estimation error.

In step S103, state information of the intelligent agents is regulated by utilizing an intelligent agent cooperation controller triggered based on self-pheromone release according to the state information of the leader intelligent agent.

In the embodiments of the present disclosure, the intelligent agent cooperation controller is used for regulating positions and speeds of the intelligent agents themselves to realize stable running control on the intelligent agents and introducing pheromone release triggering mechanism to reduce a communication load. The intelligent agent cooperation controller triggered based on self-pheromone release is expressed as:

$$u_i(t) = u_i^d(t) + u_i^{x_l}(t) + \beta_i(t)f_i(t),$$

wherein $$u_i^d(t) = -\sum_{j \in \bar{N}_i(t)} \nabla_{q_i} \varphi_\alpha(\|q_j(t) - q_i(t)\|_\sigma),$$

$$u_i^{x_l}(t) = -\hat{c}_1(p_i(t) - \hat{q}_i(t) - d_i^r),$$

$$\beta_i(t) = a_3 f_i^T(t)f_i(t),$$

$$f_i(t) = \sum_{j \in N_i(t)} a_{ij}\left(p_j(\tilde{t}_{h_j}^j) - p_i(\tilde{t}_{h_i}^i)\right) + \hat{c}_2 a_{i0}\left(\hat{p}(\tilde{t}_{h_i}^i) - p_i(\tilde{t}_{h_i}^i)\right),$$

$$\bar{N}_i(t)$$

represents a set of neighbor intelligent agents sensed by the intelligent agent i by virtue of a sensor, $N_i(t)$ represents a set of neighbor intelligent agents capable of communicating with the intelligent agent i, $u_i^d(t)$ is used for regulating a distance between the intelligent agent i and a surrounding neighbor intelligent agent, $u_i^{x_l}(t)$ is used for regulating a distance between each intelligent agent and the leader intelligent agent, $\hat{q}_i(t)$ represents information, estimated by the intelligent agent i, of the leader intelligent agent, $\nabla_{q_i}$ represents an estimation coefficient, $\hat{c}_1$ represents a constant, $d_i^r$ represents a desired distance between the intelligent agent i and the leader intelligent agent, $\beta_i(t)$ represents a second self-pheromone release parameter, $\beta_i(0) \geq 1$, $p_i(\hat{t}_{h_i}^i)$ represents a speed value of the intelligent agent i at the self-pheromone release time $\hat{t}_{h_i}^i, \hat{t}_o^i, \hat{t}_1^i, \ldots, \hat{t}_1^i$ represents a series of release times, $\hat{p}(t)$ represents an estimated speed of the leader intelligent agent, $\hat{c}_2$ represents an experimental constant, $\|\cdot\|_\sigma$ represents a σ− norm, $a_3$ represents a control coefficient, $a_{ij}$ is a communication identifier and is 0 or 1, $\varphi_\alpha = \int_d^z \varphi_\alpha(y) dy$ represents a communication state between the intelligent agent i and the intelligent agent j, and $a_{i0}$ represents a communication state between the intelligent agent i and the leader intelligent agent.

In step S104, the neighbor intelligent agents of the intelligent agents are enabled to jump the queue to the multi-intelligent-agent formation according to the state information of the intelligent agents when obstacles are encountered.

It may be known from the above-mentioned technical solution illustrated in FIG. 1 that the transportation model of the multi-intelligent-agent formation is established, and the obstacle avoidance control between the intelligent agents and the neighbor intelligent agents is performed based on the pheromones of the intelligent agents themselves and the neighbor intelligent agents of the intelligent agents; the leader intelligent agent acquires the state information of the leader intelligent agent by utilizing the distributed observer triggered based on self-pheromone release; the state information of the intelligent agents is regulated by utilizing the intelligent agent cooperation controller triggered based on self-pheromone release according to the state information of the leader intelligent agent; and the neighbor intelligent agents of the intelligent agents are enabled to jump the queue to the multi-intelligent-agent formation according to the state information of the intelligent agents when obstacles are encountered. Therefore, when encountering the obstacles, the intelligent agents can still keep the formation to satisfactorily complete a transportation task.

Another embodiment of the present disclosure provides a multi-intelligent-agent cooperated transportation method specifically includes that: each intelligent agent calculates a path gathering degree according to the number of intelligent agents serving as obstacles within a pheromone release range, and if the gathering degrees calculated by all the intelligent agents are greater than a set path gathering degree threshold, a multi-intelligent-agent formation enters a hierarchical control mode; if the gathering degree calculated by any one of the intelligent agents is smaller than the gathering degree threshold, the multi-intelligent-agent formation enters a peer interaction mode. Then, in the current state, each intelligent agent i in the multi-intelligent-agent formation marks a neighbor intelligent agent j within a relatively short communication delay distance to acquire a set of neighbor intelligent agents, or next, control input is performed, wherein the control input includes a formation control gain, a target control gain and a vehicle following control gain of which function values are maintained within a reasonable range by adding a field potential function. In the two modes, for the vehicle following control gain in the peer interaction mode, weights of influences of all rest neighbor intelligent agents to the present intelligent agent are assigned to be 1; for the vehicle following control gain in the hierarchical control mode, a weight w is assigned to influences of neighbor advantageous intelligent agents to the present intelligent agent, weights of influences of neighbor ordinary intelligent agents to the present intelligent agent are assigned to be 1, finally, a safe direction is determined, the reasonability of the control input is secondarily inspected, each intelligent agent determines whether a vector direction of the control input falls within an obstacle angle range by calculating obstacle angles occupied by all the intelligent agents serving as the obstacles within a range that may be reached by a pheromone released by the intelligent agent, thereby predicting the safety of transportation behaviors of the intelligent agents.

In some possible embodiments, the above-mentioned multi-intelligent-agent cooperated transportation method according to another embodiment may include that: a path gathering degree is determined, and a corresponding formation mode is selected according to the gathering degree; neighbor intelligent agents are determined, and different sets of the neighbor intelligent agents are divided according to different control modes; an input control amount is set; and a safe transportation direction is determined.

In some possible embodiments, the above-mentioned step that the path gathering degree is determined, and the corresponding formation mode is selected according to the gathering degree is described as follows: it is assumed that when the multi-intelligent-agent formation is driven in a certain transportation area, each intelligent agent may automatically calculate the path gathering degree within a range that may be reached by the pheromone released by the intelligent agent; if the gathering degrees calculated by all of individual intelligent agents are smaller than the gathering degree threshold, the overall swarm of the intelligent agents enters the hierarchical control mode, otherwise, it enters the peer interaction mode.

In some possible embodiments, the above-mentioned gathering degree $\delta_i$ and the gathering degree threshold $\delta_m$ are calculated by using the following methods: it is assumed that there are N intelligent agents in total in the multi-intelligent-agent formation, a transportation model of each intelligent agent i is expressed as:

$$\begin{cases} x_i = v_i \\ m_i v_i = u_i \end{cases}, i = 1, 2, \ldots, N$$

wherein $x_i$, $v_i$ and $u_i$ respectively represent a position vector, a speed vector and a input control amount of the intelligent agent i, and $m_i$ represents the mass of the intelligent agent i;

within the range that may be reached by the pheromone released by the intelligent agent i, the gathering degree $\delta_i$ detected by the intelligent agent i is expressed as:

$$\delta_i = \frac{1}{\lambda M_{di}}$$

wherein λ represents a visual fuzzy factor, $M_{di}$ represents the number of the intelligent agents serving as the obstacles detected within the range that may be reached by the pheromone released by the intelligent agent i;

the gathering degree threshold $\delta_m$ is expressed as:

$$\delta_m = \frac{1}{\lambda Q}$$

wherein Q represents a preset formation mode switching safety coefficient.

In some possible embodiments, the above-mentioned step that the neighbor intelligent agents are determined, and the different sets of the neighbor intelligent agents are divided according to the different control modes is realized as follows: an intelligent agent fleet determines a set of neighbor intelligent agents in real time within a range that may be reached by a pheromone released by the intelligent agent fleet, and a set of intelligent agent vehicles makes the following definitions according to the two control modes:

(1) determination for the neighbor intelligent agents in the peer interaction mode: a set of neighbors of the intelligent agent i in the peer interaction mode is defined as $C_i^e$ which is expressed as:

$$C_i^e = \{j | \|x_{ij}\| \leq R_{commu}^e, j \neq i\}$$

wherein $R_{commu}^e$ represents a communication distance under relatively short communication delay of the intelligent agents in the peer interaction mode, j=1, 2, ..., N represents other intelligent agents in a formation, in which the intelligent agents serving as the obstacles are removed, within the communication distance, and $x_{ij}$ represents a position vector between the intelligent agent i and a neighbor intelligent agent j of the intelligent agent i;

(2) determination for the neighbor intelligent agents in the hierarchical interaction mode: a set of neighbor intelligent agents of the intelligent agent i in the hierarchical control mode is defined as $C_i^h$ which is expressed as:

$$C_i^h = \{j | \|x_{ij}\| \leq R_{commu}^j, j \neq i\}$$

wherein $R_{commu}^h$ represents a communication distance under relatively short communication delay of the intelligent agents in the hierarchical control mode, and j=1, 2, ..., N represents other intelligent agents in a formation, in which the intelligent agents serving as the obstacles are removed, within the communication distance.

In some possible embodiments, the above-mentioned input control amount $I_i^e$ is defined as:

$$I_i^e = \sum_{i \in Pro}^{n} \int_{k_{min}^f}^{k_{max}^f} (c_t + v_{ij}) x^n dx +$$

$$\int_{k_{min}^t}^{k_{max}^t} (c_t - v_{ij})(y^{n+1} + 1) dy + \int_{k_{min}^v}^{k_{max}^v} (2c_t - v_{ij})[(z+1)^{n+1} - 3] dz$$

wherein Pro represents a set of advantageous intelligent agents, individuals of the advantageous intelligent agents are expressed as $i \in $ Pro, $k_{max}^f$ and $k_{min}^f$ respectively represent the maximum value and the minimum value of the formation control grain, $k_{max}^t$ and $k_{min}^t$ respectively represent the maximum value and the minimum value of the target control gain, $k_{max}^v$ and $k_{min}^v$ respectively represent the maximum value and the minimum value of the vehicle following control gain, $c_t$ represents a position vector of a target center point, and $v_{ij} = v_i - v_j$ represents a speed difference vector of the intelligent agent i and a neighbor intelligent agent j of the intelligent agent i.

In some possible embodiments, in a peer interaction mode, the weights of the influences of the neighbor intelligent agents to the decision of the present intelligent agent are the same and are all assigned to be 1; and in the hierarchical control mode, the weights of the influences of the neighbor advantageous intelligent agents to the decision of the present intelligent agent are w, and the weights of the influences of the neighbor ordinary intelligent agents to the decision of the present intelligent agent are 1.

In some possible embodiments, the safe transportation direction is determined as follows:

after acquiring the input control amount, the intelligent agent i calculates a real-time obstacle avoidance angle according to the surrounding intelligent agents serving as the obstacles; if the direction of the speed v serving as the input control amount falls within the range of an obstacle angle space set, a state such as the current moving speed is kept, and the input control in the previous step is given up; and if the direction of the speed v does not fall within the obstacle angle space set, the input control is performed;

for the individual intelligent agent i, the number of the intelligent agents serving as the obstacles detected within the range that may be reached by the pheromone released by the individual intelligent agent i is expressed as $N_d$, and the obstacle angle $\theta_{avoi}$ is expressed as:

$$\theta_{avoi} = \left\{ \beta \frac{1.2 R_{vision} + \frac{1}{2} R_{obsi}}{R_{obsi}} \theta_{obsi}, i = 1, 2, \ldots, N_d \right\}$$

wherein $R_{obsi}$ represents a distance between the intelligent agent i and each of the intelligent agents serving as the obstacles, $\theta_{obsi}$ represents an included angle of a speed direction of the intelligent agent i and a connecting line of the intelligent agent i and an intelligent agent serving as an obstacle, and $\beta$ represents a safety angle coefficient marked according to an actual path condition.

Figure 2:
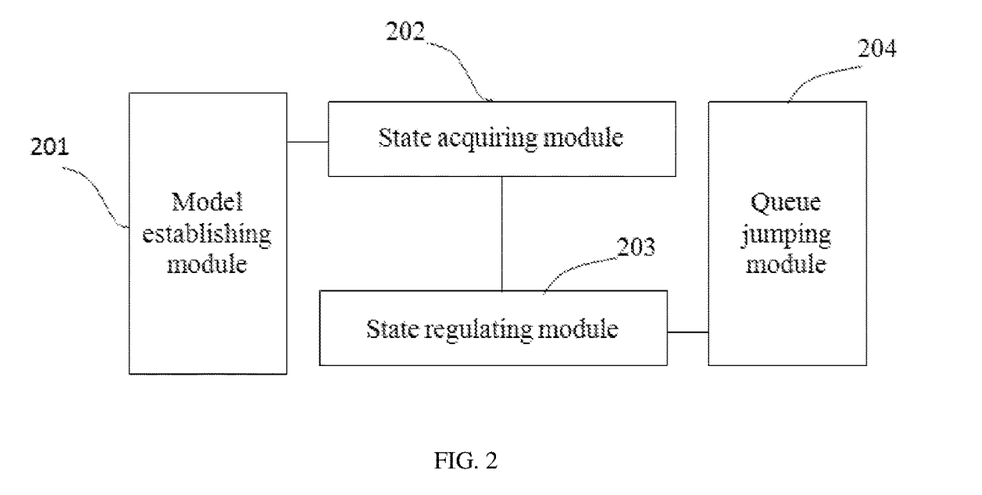
FIG. 2 is a schematic diagram showing a structure of a multi-intelligent-agent cooperated transportation system according to an embodiment of the present disclosure.

Reference is made to FIG. 2 which is a schematic structural diagram of a multi-intelligent-agent cooperated transportation system according to an embodiment of the present disclosure. The system may include a model establishing module 201, a state acquiring module 202, a state regulating module 203 and a queue jumping module 204, wherein the model establishing module 201 is configured to establish a transportation model of a multi-intelligent-agent formation, and perform obstacle avoidance control between intelligent agents and neighbor intelligent agents based on pheromones of the intelligent agents themselves and the neighbor intelligent agents of the intelligent agents;

the state acquiring module 202 is configured to acquire, by a leader intelligent agent, state information of the leader intelligent agent by utilizing a distributed observer triggered based on self-pheromone release;

the state regulating module 203 is configured to regulate, by utilizing an intelligent agent cooperation controller triggered based on self-pheromone release, state information of the intelligent agents according to the state information of the leader intelligent agent; and the queue jumping module 204 is configured to enable the neighbor intelligent agents of the intelligent agents to jump the queue to the multi-intelligent-agent formation according to the state information of the intelligent agents when obstacles are encountered.

In some possible embodiments, when the transportation model of the multi-intelligent-agent formation is established, a Cartesian coordinate system is selected as a global coordinate system to respectively establish a transportation model following the multi-intelligent-agent formation and a driving model of a leader intelligent agent.

In some possible embodiments, The transportation model following the multi-intelligent-agent formation is expressed as:

$$\begin{cases} \dot{q}_i(t) = k_1 p_i(t) \\ \dot{p}_i(t) = k_2 u_i(t) \end{cases}$$

wherein $\dot{q}_i(t) \in R^{n_i}$ represents the position of an $i^{th}$ intelligent agent, $\dot{p}_i(t) \in R^{n_i}$ represents the speed of the $i^{th}$ intelligent agent, $u_i(t) \in R^{m_i}$ represents the input control amount of the $i^{th}$ intelligent agent, $k_1$ and $k_2$ respectively represent experiential linear coefficients of $p_i(t)$ and $u_i(t)$, and $i=1, 2, \ldots, N$.

In some possible embodiments, the driving model of the leader intelligent agent is expressed as: $\dot{x}_i(t)=Sx_i(t)$, wherein $S \in R^{p \times p}$ represents a constant coefficient matrix of the leader intelligent agent, all characteristic values of which have no negative real parts, and $x_i(t) \in R^p$ represents the state information of the leader intelligent agent.

In some possible embodiments, the distributed observer triggered based on self-pheromone release is expressed as:

$$\dot{\theta}_i(t) = S_i(t)\theta_i(t) + d_i(t)\hat{g}_{li}(t)$$

$$\dot{d}_i(t) = a_1 \hat{g}_{li}^T(t) \hat{g}_{li}(t)$$

wherein $S_i(t)$ represents an observed value of a constant system matrix S observed by the intelligent agent i, $\theta_i(t)$ represents state estimation information of the leader intelligent agent, $t_l^i(t)$ represents a $l^{th}$ pheromone release time, $d_l(t)$ represents a self-pheromone release time-varying parameter, $d_l(0) \geq 1$, $a_l$ represents a positive real number, t represents a time, $i=1, \ldots, N$, $a_{ij}$ is a communication identifier, is 0 or 1 and represents a communication state between the intelligent agent i and an intelligent agent j, and $a_{i0}$ represents a communication state between the intelligent agent i and the leader intelligent agent.

In some possible embodiments, the pheromone release time is decided by a pheromone release condition, and a $(k_i+1)^{th}$ pheromone release time is acquired according to the following equation:

$$t_{k_i+1}^i = \frac{7}{8} t_{k_i+1}^i + \tilde{\tau}_{k_i}^i$$

wherein $t_{k_i}^i$ represents a $k_i^{th}$ pheromone release time, $\tilde{\tau}_{k_i}^i > 0$ represents a positive time, and $\tilde{\tau}_{k_i}^i$ is determined according to the following equation:

$$\tilde{\tau}_{k_i}^i = \inf_{t > t_{k_i}^i} \left\{ t - t_{k_i}^i \,\middle|\, l_i(t) d_i(t) \theta_{ei}^T(t) \theta_{ei}(t) > \hat{g}_{1i}^T(t) \hat{g}_{1i}(t), t \geq 0 \right\}$$

wherein both $l_i(t)$ and $d_i(t)$ represent first self-pheromone release parameters, $l_i(0) \geq 1$, $d_i(0) \geq 1$, $a_2 > 0$, $a_2$ is a positive real number, and $\theta_{ei}(t)$ represents an estimation error.

In some possible embodiments, the intelligent agent cooperation controller triggered based on self-pheromone release is expressed as:

$$u_i(t) = u_i^d(t) + u_i^{x_l}(t) + \beta_i(t) f_i(t)$$

wherein $$u_i^d(t) = -\sum_{j \in \tilde{N}_i(t)} \nabla_{q_i} \varphi_\alpha(\|q_j(t) - q_i(t)\|_\sigma),$$

$$u_i^{x_l}(t) = -\hat{c}_1(p_i(t) - \hat{q}_i(t) - d_i^r),$$

$$\beta_i(t) = a_3 f_i^T(t) f_i(t),$$

$$f_i(t) = \sum_{j \in N_i(t)} a_{ij}\left(p_j(\hat{t}_{h_j}^j) - p_i(\hat{t}_{h_i}^i)\right) + \hat{c}_2 a_{i0}\left(\hat{p}(\hat{t}_{h_i}^i) - p_i(\hat{t}_{h_i}^i)\right),$$

$$\tilde{N}_i(t)$$

represents a set of neighbor intelligent agents sensed by the intelligent agent i by virtue of a sensor, $N_i(t)$ represents a set of neighbor intelligent agents capable of communicating with the intelligent agent i, $u_i^d(t)$ is used for regulating a distance between the intelligent agent i and a surrounding neighbor intelligent agent, $u_i^{x_l}(t)$ is used for regulating a distance between each intelligent agent and the leader intelligent agent, $\hat{q}_i(t)$ represents information, estimated by the intelligent agent i, of the leader intelligent agent, $\nabla_{q_i}$ represents an estimation coefficient, $\hat{c}_1$ represents a constant, $d_i^r$ represents a desired distance between the intelligent agent i and the leader intelligent agent, $\beta_i(t)$ represents a second self-pheromone release parameter, $\beta_i(0) \geq 1$, $p_i(\hat{t}_{h_i}^i)$ represents a speed value of the intelligent agent i at the self-pheromone release time $\hat{t}_{h_i}^i, \hat{t}_0^i, \hat{t}_1^i, \ldots, \hat{t}_l^i$ represents a series of release times, $\hat{p}(t)$ represents an estimated speed of the leader intelligent agent, $\hat{c}_2$ represents an experimental constant, $\|\cdot\|_\sigma$ represents a $\sigma$– norm, $a_3$ represents a control coefficient, $a_{ij}$ is a communication identifier and is 0 or 1, $\varphi_\alpha = \int_d^z \varphi_\alpha(y) dy$ represents a communication state between the intelligent agent i and the intelligent agent j, and $a_{i0}$ represents a communication state between the intelligent agent i and the leader intelligent agent.

It should be noted that the multi-intelligent-agent cooperated transportation system according to the above-mentioned embodiment is merely illustrated by the division of all the above-mentioned functional modules during multi-intelligent agent obstacle avoidance, and in actual applications, the above-mentioned functional allocation may be completed by the different functional modules as required, that is, an internal structure of the system is divided into the different functional modules, so that all or parts of functions described as above are completed. In addition, the multi-intelligent-agent cooperated transportation system according to the above-mentioned embodiment and the embodiments of the multi-intelligent-agent cooperated transportation method belong to the same concept, and thus, the specific implementation processes and technical effects of the multi-intelligent-agent cooperated transportation system are described in detail with reference to the embodiments of the method, the descriptions thereof are omitted herein.

Figure 3:
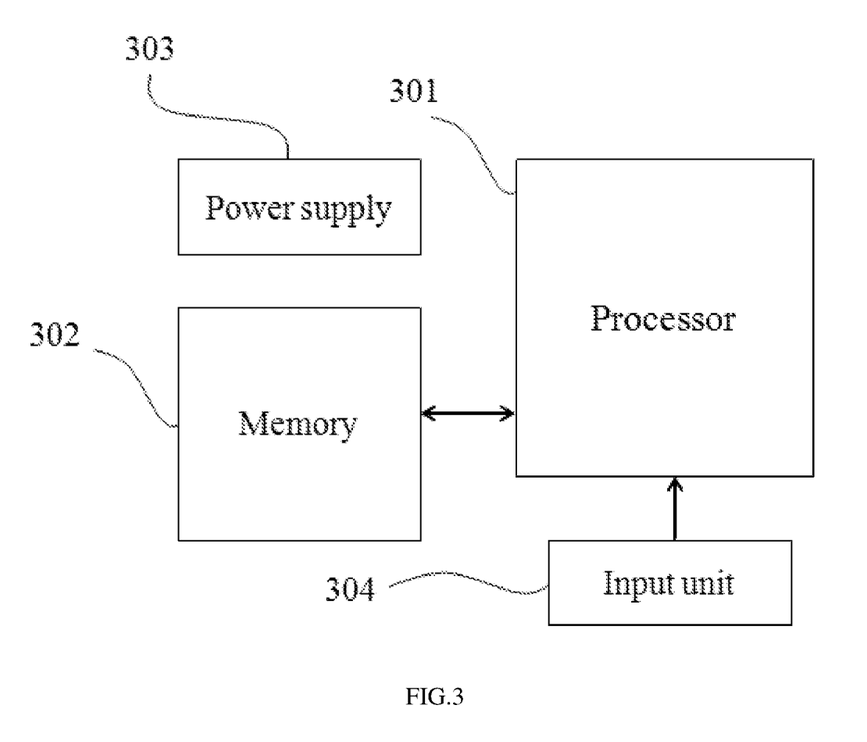
FIG. 3 is a schematic diagram showing a functional structure of a multi-intelligent-agent cooperated transportation system according to another embodiment of the present disclosure.

An embodiment of the present disclosure further provides a multi-intelligent-agent cooperated transportation system. The multi-intelligent-agent cooperated transportation system is shown in FIG. 3 which is a schematic structural diagram of the multi-intelligent-agent cooperated transportation system according to the embodiment of the present disclosure. Specifically speaking, the multi-intelligent-agent cooperated transportation system may include components such as a processor 301 with one or more processing cores, a memory 302 with one or more computer readable storage media, a power supply 303 and an input unit 304. It may be understood by the skilled in the art that the structure of the multi-intelligent-agent cooperated transportation system shown in FIG. 3 does not construct a limitation on the multi-intelligent-agent cooperated transportation system, the multi-intelligent-agent cooperated transportation system may include components more or less than those shown in the figure, or some components may be combined, or the components may be disposed to be different. Wherein the processor 301 serves as a control center of the multi-intelligent-agent cooperated transportation system, all parts of the overall multi-intelligent-agent cooperated transportation system are connected by utilizing various interfaces and circuits, various functions of the multi-intelligent-agent cooperated transportation system and data processing are performed by operating or executing software programs and/or modules stored in the memory 302 and calling data stored in the memory 302, and thus, the multi-intelligent-agent cooperated transportation system is wholly monitored. Optionally, the processor 301 may include one or more processing cores; preferably, the processor 301 may be integrated with an application processor and a modem processor, wherein the application processor is mainly used for processing an operating system, a user interface, an application and the like, and the modem processor is mainly used for processing wireless communication. It may be understood that the above-mentioned modem processor may not be integrated into the processor 301.

The memory 302 may be used for storing the software programs and the modules, and the processor 301 operates the software programs and the modules stored in the memory 302, thereby performing various function application and data processing. The memory 302 may mainly include a program storage area and a data storage area, wherein the program storage area may store an operating system, an application required by at least one function (such as a voice playing function and an image playing function) and the like; and the data storage area may store data and the like created according to the application of the multi-intelligent-agent cooperated transportation system. In addition, the memory 302 may include a high-speed random access memory and may also include a non-volatile memory, such as at least one magnetic disk memory device, a flash memory device or other volatile solid state memory devices. Correspondingly, the memory 302 may further include a memory controller so that the memory 302 is accessed by the processor 301.

The multi-intelligent-agent cooperated transportation system further includes the power supply 303 supplying power for all the components. Optionally, the power supply 303 may be logically connected with the processor 301 by a power management system, and thus, functions such as charging and discharging management and power consumption management are achieved by the power management system. The power supply 303 may further include any components such as one or more direct-current or alternating-current power supplies, a recharging system, a power failure detection circuit, a power converter or an inverter and a power state indicator.

The multi-intelligent-agent cooperated transportation system may further include the input unit 304, and the input unit 304 may be used for receiving input numbers or character information and generating signal input of a keyboard, a mouse, an operating rod and an optical or track ball which are relevant to user setting and function control.

Although it is not shown, the multi-intelligent-agent cooperated transportation system may further include a display unit and the like, the descriptions thereof are omitted herein. Specifically, in the present embodiment, the processor 301 in the multi-intelligent-agent cooperated transportation system may load executable files corresponding to progresses of one or more applications to the memory 302 according to the following instructions, and the applications stored in the memory 302 are run by the processor 301, so that various functions are achieved. The instructions are described as follows: a transportation model of a multi-intelligent-agent formation is established, and obstacle avoidance control between intelligent agents and neighbor intelligent agents is performed based on pheromones of the intelligent agents themselves and the neighbor intelligent agents of the intelligent agents; a leader intelligent agent acquires state information of the leader intelligent agent by utilizing a distributed observer triggered based on self-pheromone release; state information of the intelligent agents is regulated by utilizing an intelligent agent cooperation controller triggered based on self-pheromone release according to the state information of the leader intelligent agent; and the neighbor intelligent agents of the intelligent agents are enabled to jump the queue to the multi-intelligent-agent formation according to the state information of the intelligent agents when obstacles are encountered.

The embodiments of each of the above-mentioned operations may de described with reference to the foregoing embodiments, the descriptions thereof are omitted herein.

It may be known from above that the transportation model of the multi-intelligent-agent formation is established, and the obstacle avoidance control between the intelligent agents and the neighbor intelligent agents is performed based on the pheromones of the intelligent agents themselves and the neighbor intelligent agents of the intelligent agents; the leader intelligent agent acquires the state information of the leader intelligent agent by utilizing the distributed observer triggered based on self-pheromone release; the state information of the intelligent agents is regulated by utilizing the intelligent agent cooperation controller triggered based on self-pheromone release according to the state information of the leader intelligent agent; and the neighbor intelligent agents of the intelligent agents are enabled to jump the queue to the multi-intelligent-agent formation according to the state information of the intelligent agents when obstacles are encountered. Therefore, when encountering the obstacles, the intelligent agents can still keep the formation to satisfactorily complete a transportation task.

It may be understood by persons of ordinary skill in the art that all or parts of steps in various methods in the above-mentioned embodiments may be completed by virtue of instructions or hardware relevant to instruction control, and the instructions may be stored in a computer readable storage medium and loaded and executed by a processor.

Therefore, an embodiment of the present disclosure provides a computer readable storage medium storing a plurality of instructions therein, and the instructions, when loaded by a processor, cause the processor to perform the steps in the multi-intelligent-agent cooperated transportation method according to the embodiment of the present disclosure. For example, the instructions may perform the following steps that: a transportation model of a multi-intelligent-agent formation is established, and obstacle avoidance control between intelligent agents and neighbor intelligent agents is performed based on pheromones of the intelligent agents themselves and the neighbor intelligent agents of the intelligent agents; a leader intelligent agent acquires state information of the leader intelligent agent by utilizing a distributed observer triggered based on self-pheromone release; state information of the intelligent agents is regulated by utilizing an intelligent agent cooperation controller triggered based on self-pheromone release according to the state information of the leader intelligent agent; and the neighbor intelligent agents of the intelligent agents are enabled to jump the queue to the multi-intelligent-agent formation according to the state information of the intelligent agents when obstacles are encountered.

The embodiments of each of the above-mentioned operations may be described with reference to the foregoing embodiments, the descriptions thereof are omitted herein.

Wherein the computer readable storage medium may include a read only memory (ROM), a random access memory (RAM), a magnetic disk or an optical disk and the like.

The instructions stored in the computer readable storage medium may be used for perform the steps in the multi-intelligent-agent cooperated transportation method according to the embodiments of the present disclosure, and therefore, all beneficial effects which can be achieved by using any one of the multi-intelligent-agent cooperated transportation methods according to the embodiments of the present disclosure can be achieved, please see details in the foregoing embodiments, the descriptions thereof are omitted herein.

As above, the multi-intelligent-agent cooperated transportation method and system as well as the computer readable storage medium according to the embodiments of the present disclosure are introduced in detail. The principle and embodiments of the present disclosure are described by applying specific examples herein, and the descriptions for the above-mentioned embodiments are merely for helping the understanding of the method and a core concept thereof in the present disclosure. Meanwhile, the skilled in the art may alter the embodiments and the application scope based on the concept of the present disclosure. In summary, the contents of the present specification should not be regarded as limitations on the present disclosure.

What is claimed is:

1. A multi-intelligent-agent cooperated transportation method, comprising the steps of:
   establishing a transportation model of a multi-intelligent-agent formation, and performing obstacle avoidance control between intelligent agents and neighbor intelligent agents based on pheromones of the intelligent agents and the neighbor intelligent agents of the intelligent agents;
   acquiring, by a leader intelligent agent, state information of the leader intelligent agent by utilizing a distributed observer triggered based on self-pheromone release;
   regulating, by utilizing an intelligent agent cooperation controller triggered based on self-pheromone release, state information of the intelligent agents according to the state information of the leader intelligent agent; and
   enabling the neighbor intelligent agents of the intelligent agents to jump the queue to the multi-intelligent-agent formation according to the state information of the intelligent agents when obstacles are encountered.

2. The multi-intelligent-agent cooperated transportation method according to claim 1, wherein when the transportation model of the multi-intelligent-agent formation is established, a Cartesian coordinate system is selected as a global coordinate system to respectively establish a transportation model following the multi-intelligent-agent formation and a driving model of the leader intelligent agent.

3. The multi-intelligent-agent cooperated transportation method according to claim 2, wherein the transportation model following the multi-intelligent-agent formation is expressed as:

$$\begin{cases} \dot{q}_i(t) = k_1 p_i(t) \\ \dot{p}_i(t) = k_2 u_i(t) \end{cases}$$

wherein $\dot{q}_i(t) \in R^{n_i}$ represents the position of an ith intelligent agent, $\dot{p}_i(t) \in R^{n_i}$ represents the speed of the ith intelligent agent, $u_i(t) \in R^{m_i}$ represents the input control amount of the ith intelligent agent, $k_1$ and $k_2$ respectively represent experiential linear coefficients of $p_i(t)$ and $u_i(t)$, and $i=1, 2, \ldots, N$.

4. The multi-intelligent-agent cooperated transportation method according to claim 2, wherein the driving model of the leader intelligent agent is expressed $\dot{x}_f(t) = S x_f(t)$, wherein $S \in R^{p \times p}$ represents a constant coefficient matrix of the leader intelligent agent, all characteristic values of which have no negative real parts, and $x_f(t) \in R^p$ represents the state information of the leader intelligent agent.

5. The multi-intelligent-agent cooperated transportation method according to claim 1, wherein the distributed observer triggered based on self-pheromone release is expressed as:

$$\dot{\theta}_i(t) = S_i(t)\theta_i(t) + d_i(t)\hat{g}_{1i}(t)$$

$$\dot{d}_i(t) = a_i \hat{g}_{1i}^T(t) \hat{g}_{1i}(t)$$

wherein $S_i(t)$ represents an observed value of a constant system matrix $S$ observed by the intelligent agent i, $\theta_i(t)$ represents state estimation information of the leader intelligent agent, $t_l^i(t)$ represents a lth pheromone release time, $d_i(t)$ represents a self-pheromone release time-varying parameter, $d_i(0) \geq 1$, $a_1$ represents a positive real number, t represents a time, $i=1, \ldots, N$, $a_{ij}$ is a communication identifier, is 0 or 1 and represents a communication state between the intelligent agent i and an intelligent agent j, and $a_{i0}$ represents a communication state between the intelligent agent i and the leader intelligent agent.

6. The multi-intelligent-agent cooperated transportation method according to claim 5, wherein the pheromone release time is decided by a pheromone release condition, and a $(k_i+1)$th pheromone release time is acquired according to the following equation:

$$t_{k_i+1}^i = \frac{7}{8} t_{k_i+1}^i + \tilde{\tau}_{k_i}^i \quad t_{k_i+1}^i = \frac{7}{8} t_{k_i+1}^i + \tilde{\tau}_{k_i}^i$$

wherein $t_{k_i}^u$ represents a $k_i$ th pheromone release time, $\tilde{\tau}_{k_i}^i > 0$ represents a positive time, and $\tilde{\tau}_{k_i}^i$ is determined according to the following equation:

$$\tilde{\tau}_{k_i}^i = \inf_{t > t_{k_i}^i} \{ t - t_{k_i}^i \mid l_i(t)d_i(t)\theta_{ei}^T(t)\theta_{ei}(t) > \hat{g}_{1i}^T(t)\hat{g}_{1i}(t), t \geq 0 \}$$

wherein both $l_i(t)$ and $d_i(t)$ represent first self-pheromone release parameters, $l_i(0) \geq 1$, $d_i(0) \geq 1$, $a_2 > 0$, $a_2$ is a positive real number, and $\theta_{ei}(t)$ represents an estimation error.

7. The multi-intelligent-agent cooperated transportation method according to claim 1, wherein the intelligent agent cooperation controller triggered based on self-pheromone release is expressed as:

$$u_i(t) = u_i^d(t) + u_i^{\chi_l}(t) + \beta_i(t)f_i(t)$$

wherein $$u_i^d(t) = -\sum_{j\in \tilde{N}_i(t)} \nabla_{q_i} \varphi_\alpha(\|q_j(t) - q_i(t)\|_\sigma),$$

$$u_i^{\chi_l}(t) = -\hat{c}_1(p_i(t) - \hat{q}_i(t) - d_i^r),$$

$$\beta_i(t) = a_3 f_i^T(t) f_i(t),$$

$$f_i(t) = \sum_{j\in N_i(t)} a_{ij}\left(p_j(\hat{t}_{h_j}^j) - p_i(\hat{t}_{h_i}^i)\right) + \hat{c}_2 a_{i0}\left(\hat{p}(\hat{t}_{h_i}^i) - p_i(\hat{t}_{h_i}^i)\right),$$

$$\tilde{N}_i(t)$$

represents a set of neighbor intelligent agents sensed by the intelligent agent i by virtue of a sensor, $N_i(t)$ represents a set of neighbor intelligent agents capable of communicating with the intelligent agent i, $u_i^d(t)$ is used for regulating a distance between the intelligent agent i and a surrounding neighbor intelligent agent, $u_i^{\chi_i}(t)$ is used for regulating a distance between each intelligent agent and the leader intelligent agent, $\hat{q}_i(t)$ represents information, estimated by the intelligent agent i, of the leader intelligent agent, $\nabla_{q_i}$ represents an estimation coefficient, $\hat{c}_1$ represents a constant, $d_i^r$ represents a desired distance between the intelligent agent i and the leader intelligent agent, $\beta_i(t)$ represents a second self-pheromone release parameter, $\beta_i(0) \geq 1$, $p_i(\hat{t}_{h_i}^i)$ represents a speed value of the intelligent agent i at the self-pheromone release time $\hat{t}_{h_i}^i$, $\hat{t}_o^i, \hat{t}_1^i, \ldots, \hat{t}_l^i$ represents a series of release times, $\hat{p}(t)$ represents an estimated speed of the leader intelligent agent, $\hat{c}_2$ represents an experimental constant, $\|\cdot\|_\sigma$ represents a $\sigma-$ norm, $a_3$ represents a control coefficient, $a_{ij}$ is a communication identifier and is 0 or 1, $\varphi_\alpha = \int_d^z \varphi_\alpha(y)dy$ represents a communication state between the intelligent agent i and the intelligent agent j, and $a_{i0}$ represents a communication state between the intelligent agent i and the leader intelligent agent.

8. A multi-intelligent-agent cooperated transportation system, comprising:
   a model establishing module, configured to establish a transportation model of a multi-intelligent-agent formation, and perform obstacle avoidance control between intelligent agents and neighbor intelligent agents based on pheromones of the intelligent agents themselves and the neighbor intelligent agents of the intelligent agents;
   a state acquiring module, configured to acquire, by a leader intelligent agent, state information of the leader intelligent agent by utilizing a distributed observer triggered based on self-pheromone release;
   a state regulating module, configured to regulate, by utilizing an intelligent agent cooperation controller triggered based on self-pheromone release, state information of the intelligent agents according to the state information of the leader intelligent agent; and
   a queue jumping module, configured to enable the neighbor intelligent agents of the intelligent agents to jump the queue to the multi-intelligent-agent formation according to the state information of the intelligent agents when obstacles are encountered.

9. A multi-intelligent-agent cooperated transportation system, comprising a memory, a processor and a computer program stored in the memory and capable of running on the processor, a code of the computer program, when loaded and executed by one or more processors, causes the processor to perform the steps of the method according to claim 1.

* * * * *